United States Patent
Miller et al.

(10) Patent No.: US 11,998,411 B2
(45) Date of Patent: Jun. 4, 2024

(54) MOUTHPIECE WITH DIRECTED JETS

(71) Applicant: KONINKLIJKE PHILIPS N.V., Eindhoven (NL)

(72) Inventors: Kevin Arnold Miller, Bellevue, WA (US); David Seward, Seattle, WA (US); David Desmarais, Renton, WA (US); Eric Healy, Lynnwood, WA (US); Richard Tanaka, New York, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 190 days.

(21) Appl. No.: 17/474,241

(22) Filed: Sep. 14, 2021

(65) Prior Publication Data

US 2021/0401556 A1     Dec. 30, 2021

Related U.S. Application Data

(63) Continuation of application No. 15/543,034, filed as application No. PCT/IB2016/050402 on Jan. 27, 2016, now Pat. No. 11,116,614.

(60) Provisional application No. 62/109,297, filed on Jan. 29, 2015.

(51) Int. Cl.
    *A61C 17/02*        (2006.01)

(52) U.S. Cl.
    CPC .................. *A61C 17/0211* (2013.01)

(58) Field of Classification Search
    CPC . A61C 17/02; A61C 17/0208; A61C 17/0211; A61C 17/16; A61C 17/028
    See application file for complete search history.

(56) References Cited

U.S. PATENT DOCUMENTS

| | | | |
|---|---|---|---|
| 3,379,192 A | 4/1968 | Warren, Jr. | |
| 3,840,992 A * | 10/1974 | English | A61C 17/0211 604/77 |
| 4,106,510 A | 8/1978 | Hakim et al. | |
| 5,104,315 A | 4/1992 | McKinley | |
| 6,893,259 B1 | 5/2005 | Reizenson | |
| 8,540,660 B2 | 9/2013 | Martin et al. | |

(Continued)

FOREIGN PATENT DOCUMENTS

| | | |
|---|---|---|
| GB | 546136 | 6/1942 |
| TW | 101449724 B1 | 10/2014 |

*Primary Examiner* — Edward Moran

(57) ABSTRACT

A directed jet mouthpiece (10) comprises at least one mouthpiece trough (12, 14) configured to fit over a front portion of a dental arch of a user's teeth. The at least one mouthpiece trough includes a buccal-side vertical member (16), a lingual-side vertical member (18) and an occlusal-side horizontal member (20) extending in between. The at least one mouthpiece trough further includes at least one fluidics inlet (22), a plurality of jet orifices (24) on both buccal- and lingual-side vertical members, and at least one fluidics path (26) disposed between the fluidics inlet and jet orifices. A plurality of directed jet orifices (28) is disposed in end regions (30) of the at least one mouthpiece trough. The at least one fluidics path (26) is further disposed between the fluidics inlet and plurality of directed jet orifices. The plurality of directed jet orifices (28) direct fluid jets rearward towards a remainder of teeth in a user's mouth beyond the end regions (30) of the at least one mouthpiece trough.

12 Claims, 16 Drawing Sheets

(56) References Cited

U.S. PATENT DOCUMENTS

2006/0237020 A1    10/2006   Morgan et al.
2009/0208898 A1    8/2009   Kaplan
2011/0318705 A1    12/2011   Sullivan et al.
2013/0081217 A1    4/2013   Jeong
2017/0056143 A1    3/2017   Hyun

* cited by examiner

MOUTHPIECE WITH DIRECTED JETS

CROSS-REFERENCE TO PRIOR APPLICATIONS

This application is a continuation of U.S. application Ser. No. 15/543,034, filed on Jul. 12, 2017, which is a U.S. National Phase application under 35 U.S.C. § 371 of International Application No. PCT/IB2016/050402, filed on Jan. 27, 2016, which claims priority from Provisional Application No. 62/109,297, filed on Jan. 29, 2015. These applications are hereby incorporated by reference herein.

The present embodiments relate generally to oral hygiene devices and more particularly, to a mouthpiece with directed jets and a method therefor.

Use of a mouthpiece to provide treatment for the whole dental arch of a user's mouth is highly desirable for effective consistent treatment. However, this is often times difficult due to large variations in people's oral geometry including, in particular, the oral geometry for arch length. A number of mouthpieces are known, however, none of the known mouth pieces have practically solved the issue of arch length. In one known mouthpiece, the mouthpiece utilizes customization for a person's unique oral geometry; however, customization to a given user's oral geometry makes the mouthpiece more expensive and difficult to obtain. Such customized mouthpieces are difficult to obtain since a person needing one would have to go to the dentist first to get measured and fitted for such a customized mouthpiece.

Accordingly, an improved method and apparatus for overcoming the problems in the art is desired.

In accordance with one aspect, a directed jet mouthpiece is disclosed which includes at least one mouthpiece trough and a plurality of directed jet orifices disposed in end regions of the at least one mouthpiece trough. The at least one mouthpiece trough is configured to fit over at least a front portion of at least one or more of an upper and a lower dental arch of teeth in a user's mouth, the at least one mouthpiece trough having a buccal-side vertical member, a lingual-side vertical member and an occlusal-side horizontal member that extends between the buccal-side and the lingual-side vertical members.

The at least one mouthpiece trough further includes at least one fluidics inlet, a plurality of jet orifices on both the buccal-side and lingual-side vertical members, and at least one fluidics path disposed between the at least one fluidics inlet and the jet orifices. The at least one fluidics path is further disposed between the at least one fluidics inlet and the plurality of directed jet orifices. The plurality of directed jet orifices are configured for directing fluid jets rearward towards a remainder of teeth in a user's mouth beyond the end regions of the at least one mouthpiece trough.

In one embodiment of the directed jet mouthpiece, the buccal-side jet orifices face (i.e., are oriented to output or exhaust fluid jets) in a direction of the lingual-side vertical member. In addition, the lingual-side jet orifices face (i.e., are oriented to output or exhaust fluid jets) in a direction of the buccal-side vertical member.

In another embodiment of the directed jet mouthpiece, each of the end regions of the at least one mouthpiece trough further includes at least one vertically disposed plenum. At least one of the plurality of directed jet orifices is disposed in the at least one vertically disposed plenum. In addition, the at least one vertically disposed plenum can comprise one or more of (i) an inward vertically disposed plenum and (ii) an outward vertically disposed plenum on each end region of the buccal-side and the lingual-side vertical members of the at least one mouthpiece trough.

According to another embodiment of the directed jet mouthpiece, a front portion of the directed jet mouthpiece is configured for usage with at least one or more of an upper and a lower dental arch of teeth in a user's mouth. Preferably, the front portion is configured to have an arch length sized to fit a 2.5 percentile user teeth set and an arch shape and width configured to fit a mean teeth set.

In yet another embodiment of the directed jet mouthpiece, the at least one mouthpiece trough further comprises one or more of an upper mouthpiece trough and a lower mouthpiece trough. In addition, the at least one vertically disposed plenum (78) of the directed jet mouthpiece comprises one or more of (i) an inward vertically disposed plenum and (ii) an outward vertically disposed plenum on each end region of the buccal-side and the lingual-side vertical members of the one or more of the upper mouthpiece trough and the lower mouthpiece trough. Furthermore, in one embodiment, the plurality of directed jet orifices comprises three directed jet orifices disposed in each of (i) the inward vertically disposed plenum and (ii) the outward vertically disposed plenum.

According to another embodiment of the directed jet mouthpiece, the occlusal-side horizontal member includes a plurality of chevrons extending between a top surface and a bottom surface thereof. In particular, the chevrons extend between the upper and lower mouthpiece troughs.

In a further embodiment of the directed jet mouthpiece, the at least one fluidics path disposed between (i) the at least one fluidics inlet and (ii) the jet orifices and the plurality of directed jet orifices comprises at least one or more of a buccal spine and lingual spine. Each of the at least one fluidics path includes a principal channel that traverses horizontally along each of the buccal spine and lingual spine. The at least one fluidics path further includes secondary channels, smaller in cross-section than the principal channel, extending vertically from a horizontally disposed principal channel. In addition, the secondary channels are spaced apart from one another by a prescribed horizontal distance. Furthermore, each secondary channel can include a "D" shaped cross-section having jet orifices disposed within an inner flat surface thereof. With respect to secondary channels, in one embodiment, the jet orifices disposed within the inner flat surface comprise at least two jet orifices.

In another embodiment, the lingual spine includes a compensating geometry that comprises a transition from a vertical surface to an angled surface between positions that correspond to positions of canine teeth in the user's mouth, and closely matching lingual sides of incisors angled with respect to lingual sides of molars in the user's mouth. In addition, each of the buccal spine and the lingual spine can comprise two halves bonded together to form a respective spine with principal and secondary channels corresponding to the at least one fluidics path.

According to another embodiment, the at least one fluidics inlet of the directed jet mouthpiece comprises at least one buccal-side fluidics inlet and a lingual-side fluidics inlet coupled to at least one fluidics path within the buccal-side vertical member and a fluidics path within the lingual-side vertical member, respectively, of the at least one mouthpiece trough.

In yet another embodiment, the at least one mouthpiece trough of the directed jet mouthpiece further includes a plurality of jet-to-teeth spacing ribs. The jet-to-teeth spacing ribs are vertically disposed and horizontally spaced apart from one another on adjacent sides of the buccal-side and lingual-side vertical members only. In other words, the jet-to-teeth spacing ribs are preferably on inner surfaces of the at least one mouthpiece trough.

In a further embodiment of the directed jet mouthpiece, the occlusal-side horizontal member that extends between the buccal-side and the lingual-side vertical members comprises overmold material of elastomer. In addition, the overmold material of elastomer is disposed on selective outside surfaces of the buccal-side and the lingual-side vertical members.

According to another embodiment, the directed jet mouthpiece further comprises a vacuum port coupled to a dedicated vacuum line disposed in one or more of a buccal-side vacuum support member, a lingual-side vacuum support member, and a pass-through member disposed between the buccal-side vacuum support member and the lingual-side vacuum support member. The pass-through member comprises one or more of a single pass-through member and a multiple pass-through member.

In accordance with another embodiment, a method of oral healthcare via a directed jet mouthpiece comprises directing a first fluid flow via a plurality of jet orifices of at least one mouthpiece trough configured to fit over at least a front portion of at least one or more of an upper and a lower dental arch of teeth in a user's mouth. The at least one mouthpiece trough includes a buccal-side vertical member, a lingual-side vertical member and an occlusal-side horizontal member that extends between the buccal-side and the lingual-side vertical members. The at least one mouthpiece trough further includes at least one fluidics inlet, the plurality of jet orifices being disposed on both the buccal-side and lingual-side vertical members, and at least one fluidics path disposed between the at least one fluidics inlet and the jet orifices.

The method further comprises directing a second fluid flow via a plurality of directed jet orifices disposed in end regions of the at least one mouthpiece trough. The at least one fluidics path is further disposed between the at least one fluidics inlet and the plurality of directed jet orifices, wherein the plurality of directed jet orifices are configured for directing fluid jets rearward towards a remainder of teeth in a user's mouth beyond the end regions of the at least one mouthpiece trough.

In another embodiment, the method further comprises providing the directed jet mouthpiece with one or more of an upper mouthpiece trough and a lower mouthpiece trough. In addition, each of the end regions of the at least one mouthpiece trough further includes at least one vertically disposed plenum, wherein at least one of the plurality of directed jet orifices is disposed in the at least one vertically disposed plenum. Furthermore, the at least one vertically disposed plenum can comprise one or more of (i) an inward vertically disposed plenum and (ii) an outward vertically disposed plenum on each end region of the buccal-side and the lingual-side vertical members of the one or more of the upper mouthpiece trough and the lower mouthpiece trough.

Still further advantages and benefits will become apparent to those of ordinary skill in the art upon reading and understanding the following detailed description.

The embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

Figure 18:
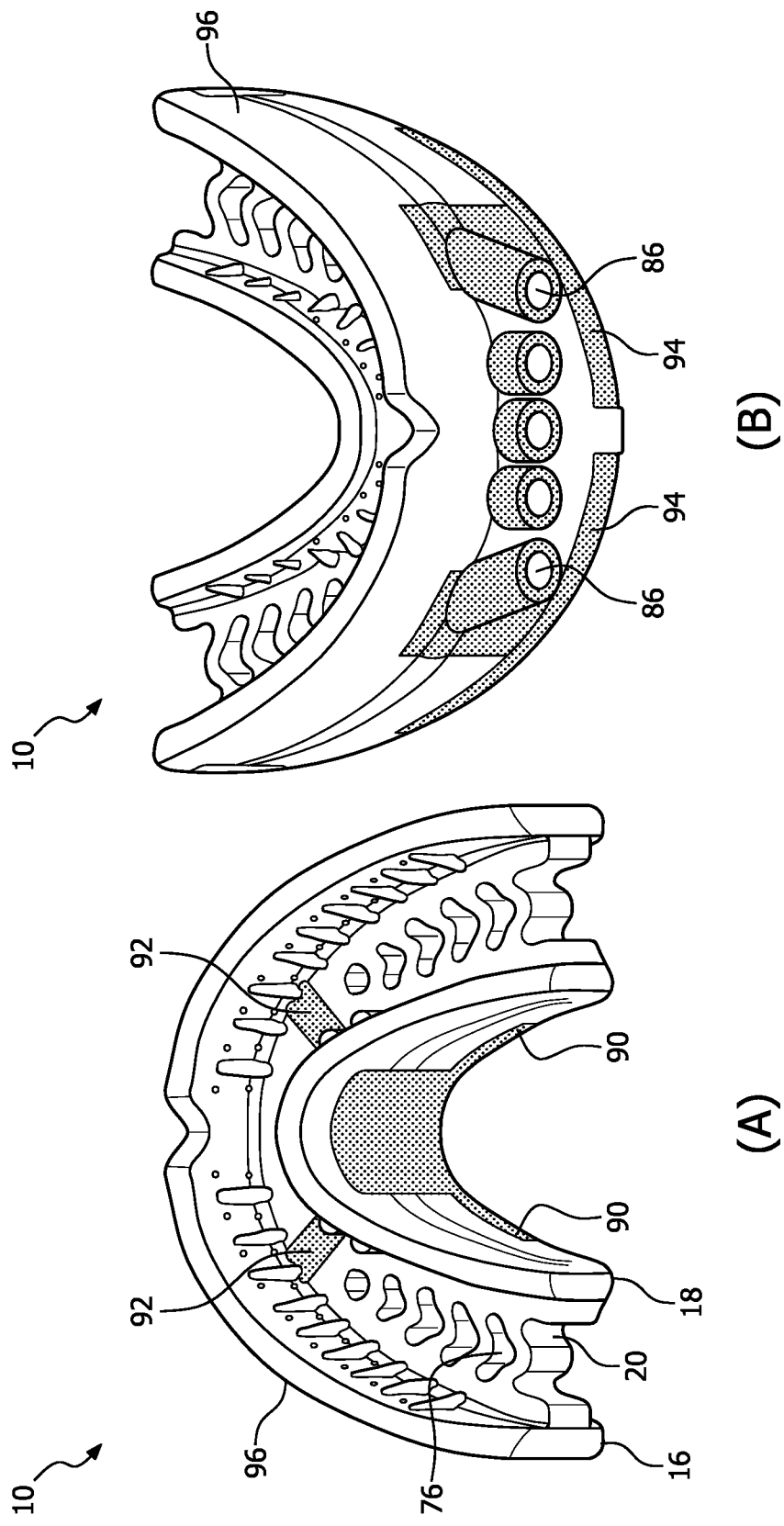
Figure 19:
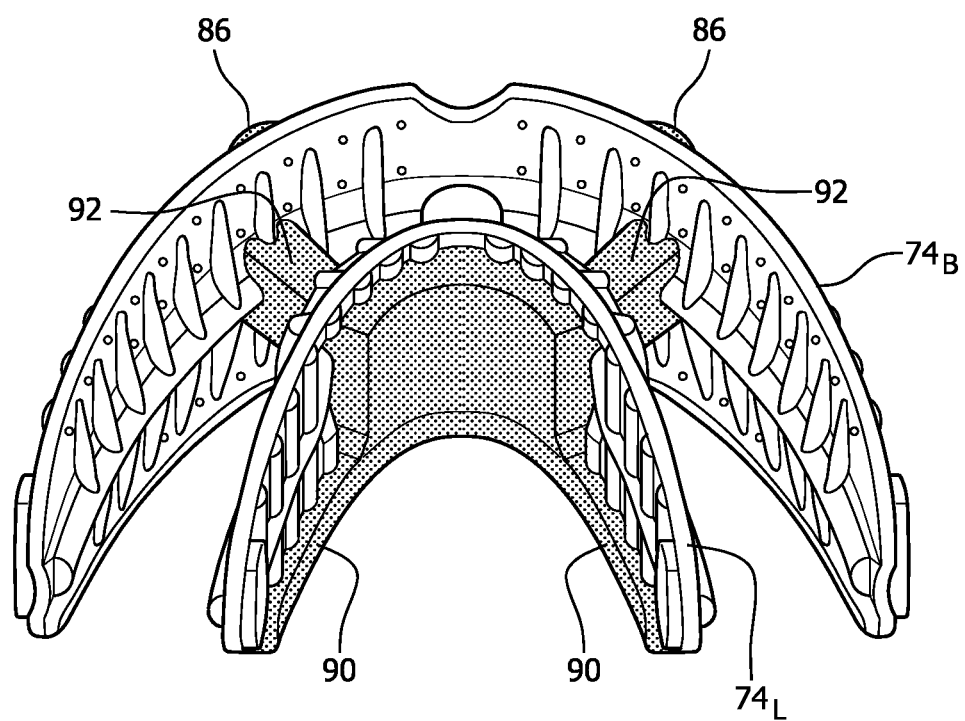

FIG. 18 is a rear perspective view of the buccal and lingual spines of the directed jet mouthpiece including dedicated vacuum lines with over molding (18A) and a front perspective view of the buccal and lingual spines of the directed jet mouthpiece including at least one vacuum port and dedicated vacuum lines with over molding (18B) according to an embodiment of the present disclosure; and FIG. 19 is a rear perspective view of the buccal and lingual spines of the directed jet mouthpiece including at least one vacuum pass-through and dedicated vacuum lines without over molding according to an embodiment of the present disclosure.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

According to one embodiment of the present disclosure, a directed jet mouthpiece comprises upper and lower trough portions configured for covering the front teeth of a user's mouth and extending back to cover the smaller adult dental arches (2.5%). The directed jet mouthpiece further comprises directed jets configured for dispensing a cleaning fluid or other suitable fluid to the back molars of larger dental arches. As will become apparent via this disclosure, the features of the mouthpiece advantageously enable a user to maintain a high level of clean with respect to the teeth in the user's mouth.

In one embodiment, the directed jet mouthpiece comprises a one size fits all option. Its arch length is sized so that it will fit the 2.5 percentile user. For users with larger arch lengths, directed jets located at the back of the mouthpiece advantageously direct a working fluid onto the exposed teeth at the rear of the user's mouth. For those teeth in the rear of the user's mouth, the cleaning action of the mouthpiece relies primarily on the chemical properties of the fluid. This advantageously allows the mouthpiece to clean larger mouths, while being sized to be comfortable for small mouths.

Figure 1:
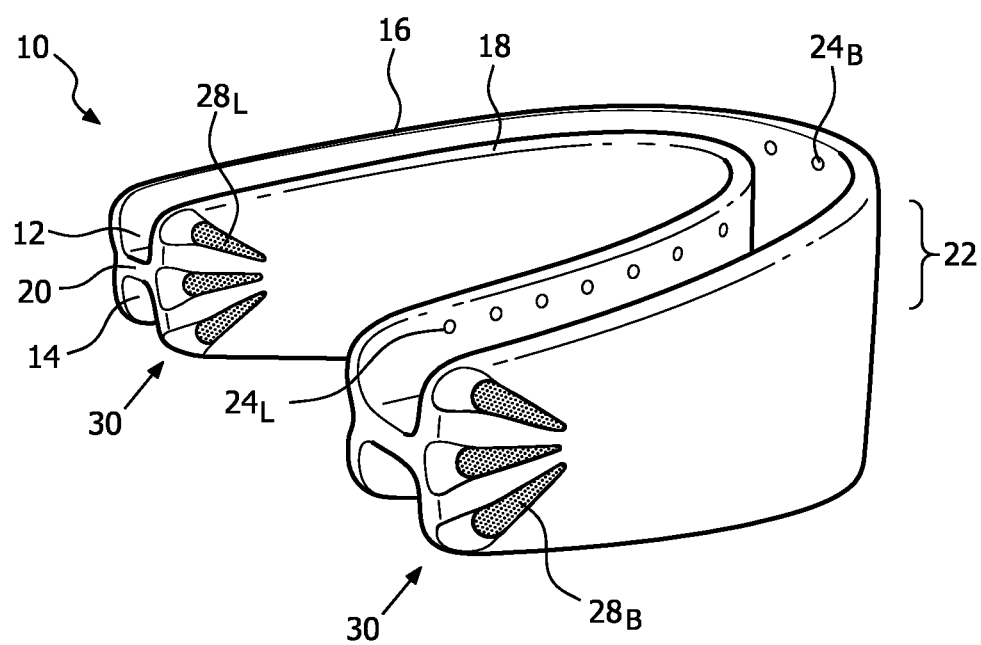
FIG. 1 is a perspective view of a directed jet mouthpiece according to an embodiment of the present disclosure.

With reference now to FIG. 1, there is shown a perspective view of a directed jet mouthpiece 10 according to an embodiment of the present disclosure. The directed jet mouthpiece 10 comprises at least one mouthpiece trough (12, 14) configured to fit over at least a front portion of at least one or more of an upper and a lower dental arch of teeth in a user's mouth. In one embodiment, the at least one mouthpiece trough (12, 14) comprises one or more of an upper mouthpiece trough 12 and a lower mouthpiece trough 14. The at least one mouthpiece trough (12, 14) includes a buccal-side vertical member 16, a lingual-side vertical member 18 and an occlusal-side horizontal member 20. The occlusal-side horizontal member 20 extends between the buccal-side and the lingual-side vertical members, 16 and 18, respectively. The at least one mouthpiece trough (12, 14) also includes at least one fluidics inlet 22, as will be discussed further herein with reference to FIGS. 10, 11, 13 and 14. In addition, the at least one mouthpiece trough (12, 14) includes a plurality of jet orifices 24 ($24_B$, $24_L$) on both the buccal-side and lingual-side vertical members, 16 and 18, respectively, as will be discussed further herein with reference to FIGS. 12 and 13. Furthermore, the at least one mouthpiece trough (12, 14) includes at least one fluidics path 26 ($26_B$, $26_L$) (shown in FIGS. 10 and 14) disposed between the at least one fluidics inlet 22 and the jet orifices 24 ($24_B$, $24_L$).

With reference still to FIG. 1, the directed jet mouthpiece 10 further comprises a plurality of directed jet orifices 28 ($28_B$, $28_L$) disposed in end regions 30 of the at least one mouthpiece trough (12, 14). In the perspective view of the directed jet mouthpiece 10 of FIG. 1, only two of four sets of the plurality of directed jet orifices are shown. That is, each end region 30 includes a first set and a second set of a plurality of directed jet orifices, one set on each of the buccal-side and the lingual-side of a respective end region 30 (see also FIGS. 11 and 12). The at least one fluidics path 26 ($26_B$, $26_L$) is further disposed between the at least one fluidics inlet 22 and the plurality of directed jet orifices 28 ($28_B$, $28_L$), as will be discussed further herein with reference to FIGS. 10, 14 and 15. Furthermore, the plurality of directed jet orifices 28 ($28_B$, $28_L$) are configured for directing fluid jets rearward towards a remainder of teeth that are present in a user's mouth beyond the end regions 30 of the at least one mouthpiece trough (12, 14).

As mentioned herein above, the arch length of the directed jet mouthpiece has been sized to fit the 2.5 percentile user. However, the arch shape and width have been set to fit the mean teeth set. Variation from the mean by these two parameters is advantageously handled by insuring the compliance is high enough to allow the mouthpiece to self-adjust where required.

Figure 2:
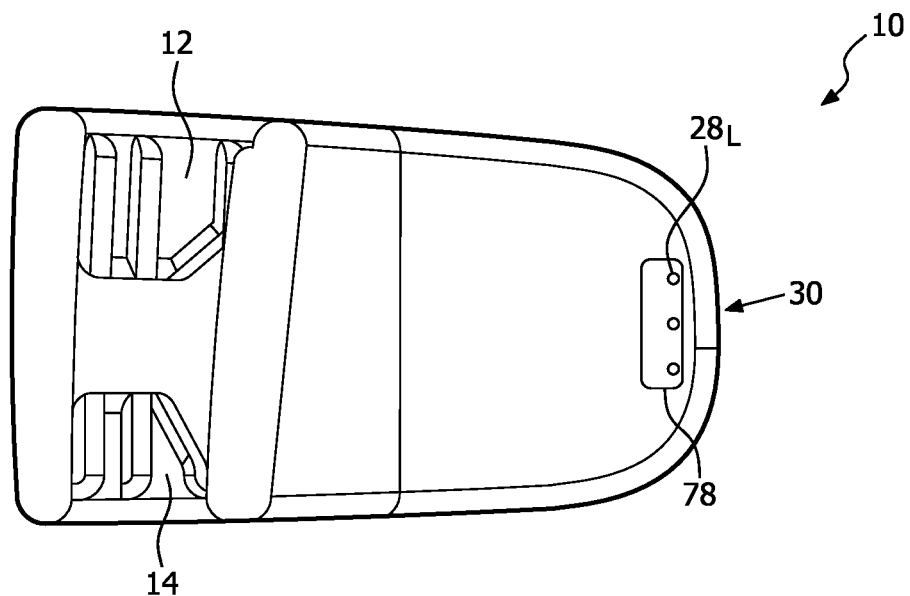
FIG. 2 is a sectional view of upper and lower troughs of the directed jet mouthpiece according to an embodiment of the present disclosure.
Figure 3:
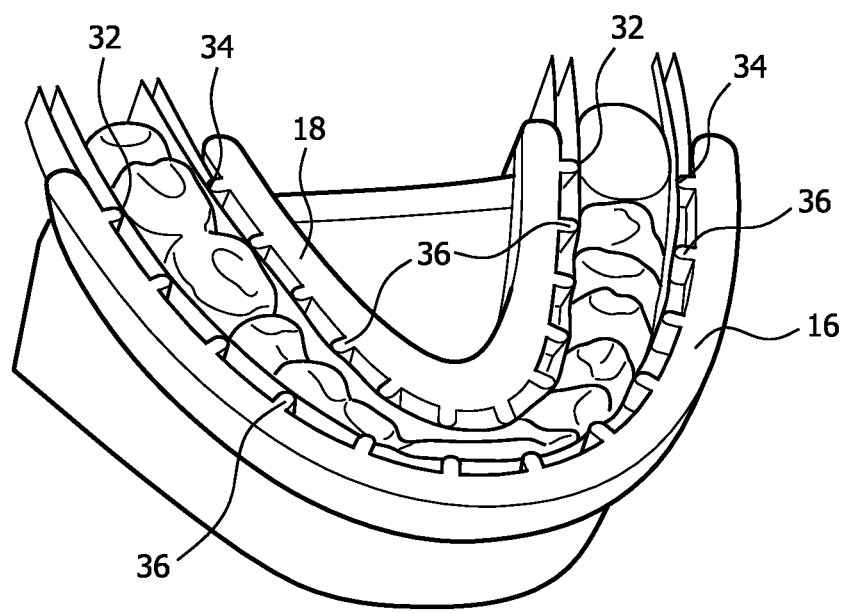
FIG. 3 is a perspective view of a sizing of the lower mouthpiece trough to a mean teeth set according to an embodiment of the present disclosure.

With reference now to FIG. 2, there is shown a sectional view of upper and lower troughs, 12 and 14, respectively, of the directed jet mouthpiece 10 according to an embodiment of the present disclosure. FIG. 2 shows how the mouthpiece troughs have been sized to the mean teeth set and, more particularly, FIG. 3 illustrates a perspective view of a sizing of the lower mouthpiece trough to the mean teeth set. With reference to FIG. 3, innermost surfaces 32 of the each trough follow the inner and outer curvature of the teeth. A second set of offset surfaces 34 are provided, wherein the second set of offset surfaces represent a standoff for the jets, i.e., corresponding to the plurality of jet orifices 24 on both the buccal-side and lingual-side vertical members, 16 and 18, respectively. In particular, the second set of surfaces 34 is used to create the vertical walls of the troughs. The second set of surfaces further includes vertically disposed ribs 36 added to an inside of the respective troughs that are horizontally spaced apart from each other to ensure the principal surfaces of the trough remain at a given minimum distance off the teeth, e.g., on the order of 2 mm off the teeth.

Figure 4:
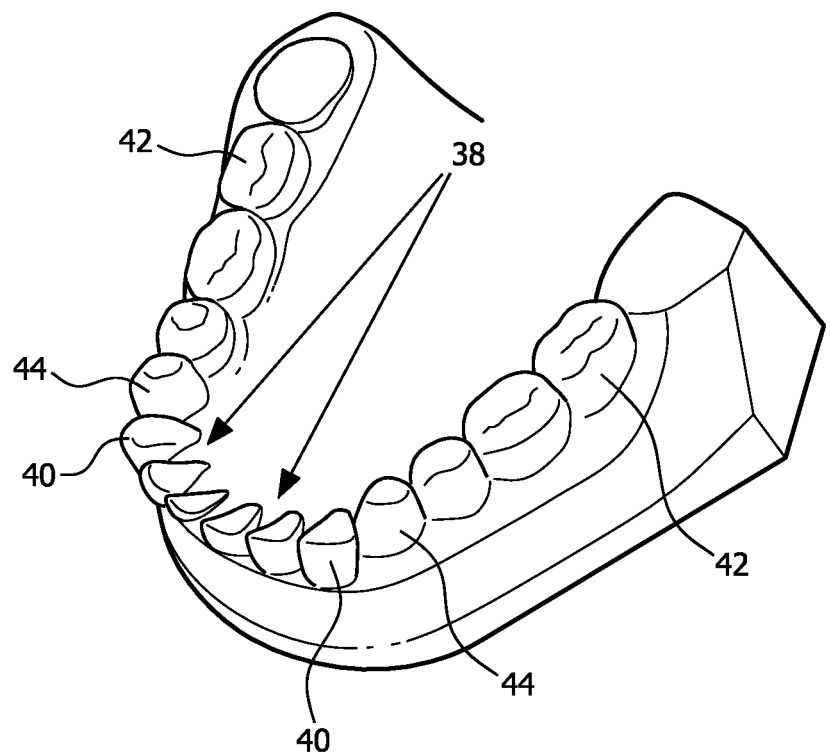
FIG. 4 is a perspective view of an illustrative angled lingual surface of incisors for which a directed jet mouthpiece according to an embodiment of the present disclosure is configured for use.

With reference now to FIG. 4, there is shown a perspective view of an illustrative angled lingual surface 38 of incisors 40 for which a directed jet mouthpiece 10 according to an embodiment of the present disclosure is configured for use. The lingual sides 38 of the incisors 40 are angled with respect to the lingual side of the molars 42. The transition from vertical to angled surface takes place between the canine teeth 44.

The angled incisor surfaces 38 are far enough from the vertical that the walls of the troughs are designed to compensate for the jets that would otherwise be located a distance greater than 2 mm (i.e. >2 mm) from the teeth surface. Though the location of the incisors vary from mouth to mouth, their location in the mean teeth set is used to locate a compensating geometry. In other words, a compensating geometry of the directed jet mouthpiece comprises a transition from a vertical surface to an angled surface between positions that correspond to positions of canine teeth in the user's mouth, and closely matching lingual sides of incisors angled with respect to lingual sides of molars in the user's mouth, as will be discussed further herein with reference to FIGS. 5, 10, 11 and 13.

Figure 5:
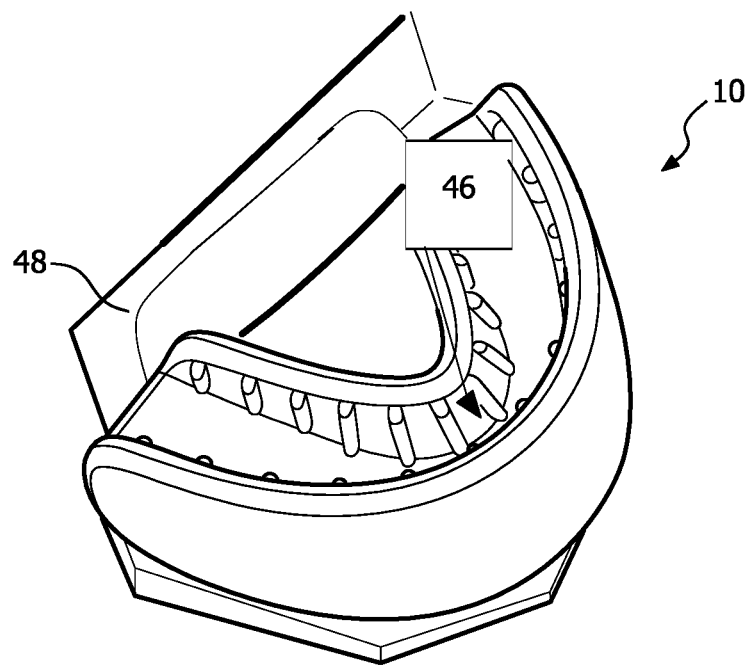
FIG. 5 is a perspective view of an angled trough surface of the directed jet mouthpiece according to an embodiment of the present disclosure, further illustrating a phantom image of an angled lingual surface of incisors overlying the angled trough surface.

With reference now to FIG. 5, there is shown a perspective view of an angled trough surface 46 of the directed jet mouthpiece 10 according to an embodiment of the present disclosure, further illustrating a phantom image 48 of an angled lingual surface of incisors overlying the angled trough surface 46. As disclosed herein, the directed jet mouthpiece 10 includes a front portion configured for usage with at least one or more of an upper and a lower dental arch of teeth in a user's mouth and having an arch length sized, i.e., configured, to fit a 2.5 percentile user teeth set and an arch shape and width configured to fit a mean teeth set.

Figure 6:
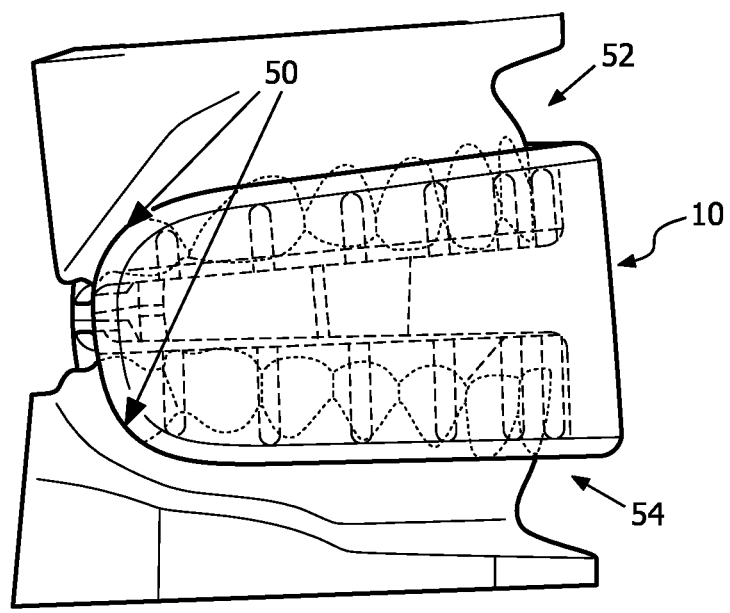
FIG. 6 is a side see-through view illustrating a rear mouthpiece curvature of the directed jet mouthpiece according to an embodiment of the present disclosure disposed within a model of upper and lower sets of teeth.

With reference now to FIG. 6, there is shown a side see-through view illustrating a rear mouthpiece curvature 50 of the directed jet mouthpiece 10 disposed within a model of upper and lower sets of teeth, 52 and 54, respectively. The rear mouthpiece curvature 50 of the lingual and buccal vertical walls was shaped to fit the cheek to gum line interface interpreted from the mean teeth set.

Figure 7:
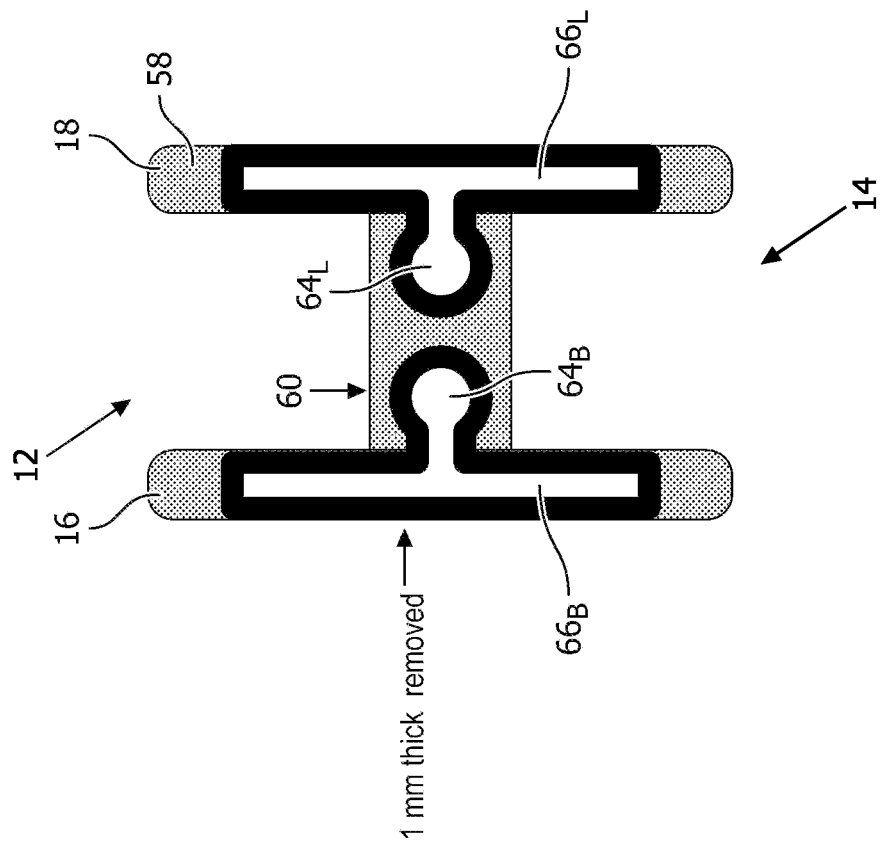
FIG. 7 is a cross-sectional view of upper and lower troughs of the directed jet mouthpiece with a first over molding according to an embodiment of the present disclosure.

With reference now to FIG. 7, there is shown a cross-sectional view of upper and lower troughs, 12 and 14, respectively, of the directed jet mouthpiece with a first overmolding (56, 58, 60) according to an embodiment of the present disclosure. The wall thicknesses of the directed jet mouthpiece are selected according to various requirements for the mouthpiece fluidics components. In one embodiment, the vertical walls on the buccal and lingual sides of the troughs were each set at 4 mm thickness. This was driven by two, 1 mm thick walls that form outer and inner shells 62 of the fluidics assembly disposed within the respective walls. Between the outer and inner shells 62, 1 mm was left for fluid flow, and lastly, 1 mm was allotted for elastomeric material 56 to cover the outside surface of the corresponding buccal or lingual wall.

The horizontal wall of elastomer material 60 lies in the occlusal plane and is configured to contain a 2.5 mm internal diameter of the primary fluid passages or flow channels 64 ($64_B$, $64_L$) of the fluidics assembly. A wall thickness of 1 mm was budgeted for the wall 65 of each flow channel 64 ($64_B$, $64_L$). A thickness of 1 mm of elastomeric material was assumed to cover each flow channel 64 ($64_B$, $64_L$) on upper and lower sides of the respective channels. In addition, illustrated in the cross-sectional view of FIG. 7 are secondary flow channels 66 ($66_B$, $66_L$) that are coupled with the primary fluid passages or flow channels 64 ($64_B$, $64_L$) and extend vertically, as will be discussed further herein below. Furthermore, a three degree angle (3°) was incorporated into this occlusal wall, e.g., from the back to the front of the mouthpiece, to facilitate the bite of the upper and lower teeth sets. In one embodiment, this resulted in a minimum thickness for the occlusal wall of 6.5 mm towards the back of the mouthpiece and 9 mm thickness towards the front.

From the above discussion, it is understood that the directed jet mouthpiece comprises a form factor with a given geometry. The resilient elastomeric portions of the directed jet mouthpiece can be made from one or more different durometers of Steralloy™ elastomer, such as 20, 35 and 55 Shore A. In addition, the fluidics assembly of the directed jet mouthpiece will be discussed further herein below.

Figure 8:
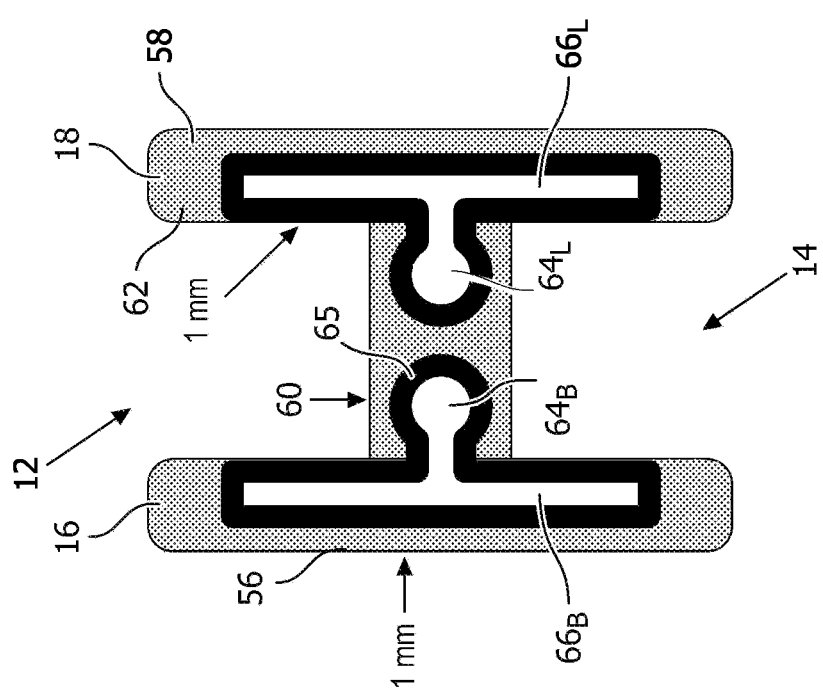
FIG. 8 is a cross-sectional view of upper and lower troughs of the directed jet mouthpiece with a reduced over molding according to an embodiment of the present disclosure.
Figure 9:
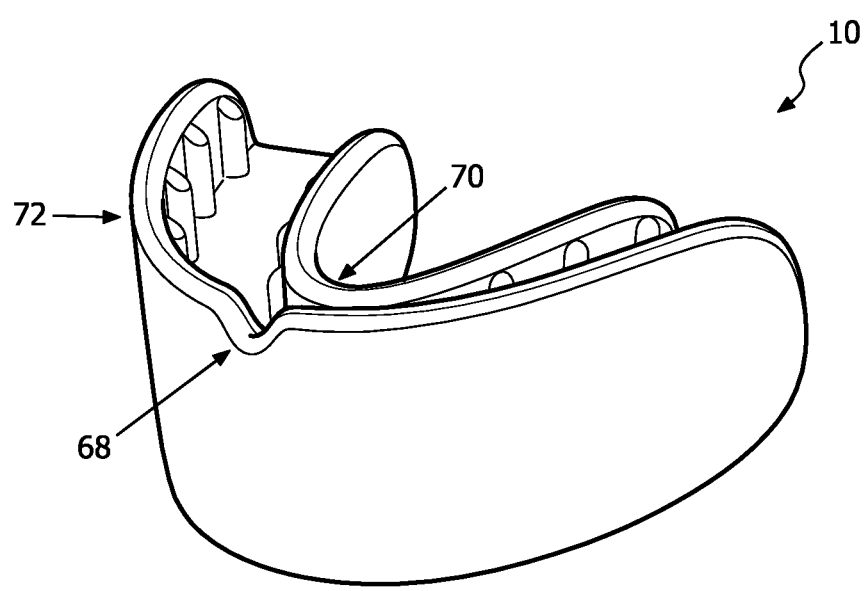
FIG. 9 is a perspective view of the directed jet mouthpiece including a maximallary frenulum relief and a reduced height lingual side vertical wall according to an embodiment of the present disclosure.

With reference now to FIG. 8, there is shown a cross-sectional view of upper and lower troughs, 12 and 14, respectively, of the directed jet mouthpiece 10 with a reduced over molding (58, 60) according to an embodiment of the present disclosure. During an evaluation it was determined that it would be beneficial for user comfort and preference to reduce an overall size of the mouthpiece. Accordingly, an effort was made to remove as much excess volume as possible. One primary modification consisted of removing the over mold material from the outer walls (indicated by reference numeral 56 in FIG. 7), leaving the rigid walls of the fluidics exposed. Other modifications to the form factor included reducing the height of the lingual side vertical wall and adding a relief for the maxillary frenulum. The resulting form factor was on the order of about 22% smaller by volume than the original. FIG. 9 illustrates a perspective view of the directed jet mouthpiece 10 including a maximallary frenulum relief 68 and a reduced height lingual side vertical wall 70 according to an embodiment of the present disclosure. In particular, the reduced height lingual side vertical wall 70 comprises a height dimension less than a height dimension of the buccal side vertical wall 72.

Figure 10:
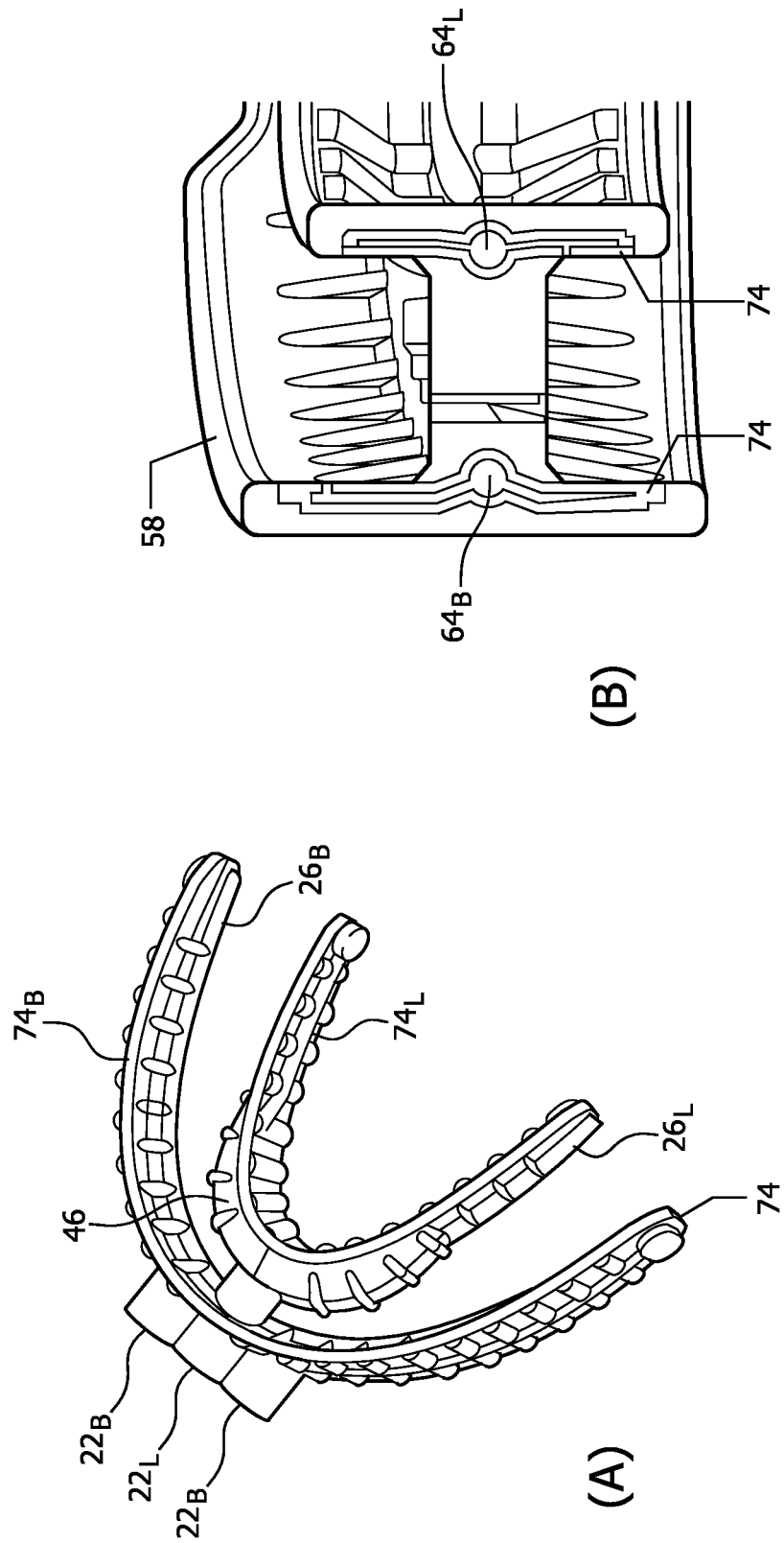
FIG. 10 is a perspective view of buccal and lingual spines of the directed jet mouthpiece without over molding (10A) and a cross-sectional view of the buccal and lingual spines with over molding of the directed jet mouthpiece (10B) according to an embodiment of the present disclosure.

With reference now to FIG. 10, there is shown a perspective view of buccal and lingual spines 74 ($74_B$, $74_L$) of the directed jet double spine mouthpiece without over molding (FIG. 10A) and a cross-sectional view of the buccal and lingual spines 74 ($74_B$, $74_L$) with over molding of the directed jet mouthpiece (FIG. 10B) according to an embodiment of the present disclosure.

Using the updated form factor, the internal working fluidics of the directed jet mouthpiece was developed. In one embodiment, the fluidics design includes molded-in fluid channels with twelve rear facing jets that direct fluid over the exposed teeth of the higher percentile users. The surfaces of the form factor were used as the starting point of the design to leverage the fit checks previously completed. The internal fluid paths use rigid materials that have one inlet for the lingual side and one inlet for the buccal side. The rigid fluidics parts form a "spine" on both vertical sides of the "H" section (see FIG. 10B). In one embodiment, the fluidics channels are designed with 0.75 mm thick walls, i.e., decreased from the 1.0 mm wall thickness discussed earlier herein. The inventors found from the early fit checks that reducing an overall size of the mouthpiece advantageously provides for an improved user comfort. Accordingly, the fluidics design allows for thinner walls. A further decrease in mouthpiece volume is also possible with this design, to be discussed further herein below.

In one embodiment, the at least one fluidics path 26 ($26_B$, $26_L$) disposed between (i) the at least one fluidics inlet 22 ($22_B$, $22_L$) and (ii) the jet orifices 24 ($24_B$, $24_L$) and the plurality of directed jet orifices 28 ($28_B$, $28_L$) comprises at least one or more of a buccal spine $74_B$ and lingual spine $74_L$, each including a principal channel 64 ($64_B$, $64_L$) that traverses horizontally along each of the buccal spine and lingual spine, further including secondary channels 66 ($66_B$, $66_L$), smaller in cross-section than the principal channel, extending vertically from the horizontally disposed principal channel. See FIG. 8.

With reference again to FIG. 10A, the lingual spine $74_L$ further includes a compensating geometry 46 that comprises a transition from a vertical surface to an angled surface between positions that correspond to positions of canine teeth in the user's mouth. The compensating geometry 46 closely matches lingual sides of incisors and is angled with respect to lingual sides of molars in the user's mouth. The compensating geometry 46 includes the angled trough surface, as previously discussed herein with respect to FIGS. 4 and 5. In addition, the at least one fluidics inlet 22 comprises at least one buccal-side fluidics inlet $22_B$ and a lingual-side fluidics inlet $22_L$ coupled to at least one fluidics path $26_B$ within the buccal-side vertical member 16 and a fluidics path $26_L$ within the lingual-side vertical member 18, respectively, of the at least one mouthpiece trough (12, 14), as shown in FIG. 1.

Figure 11:
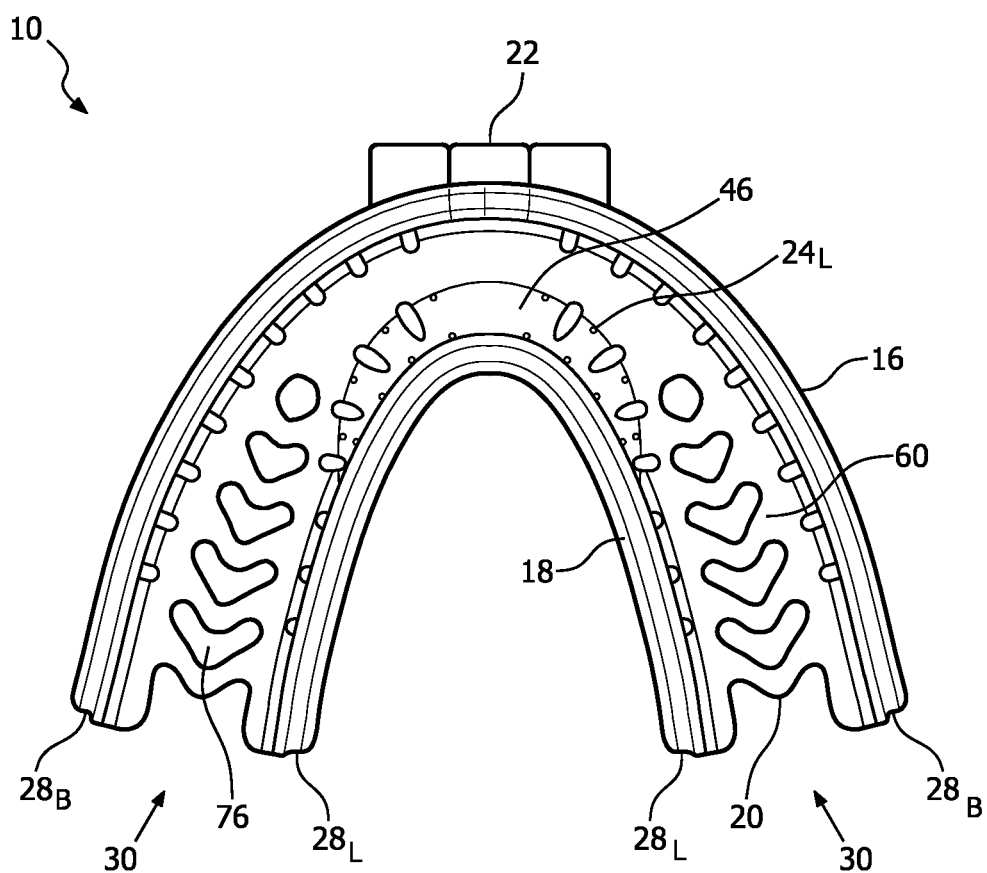
FIG. 11 is a top perspective view of the directed jet mouthpiece including reliefs in the occlusal plane material according to an embodiment of the present disclosure.

With reference now to FIG. 11, there is shown a top perspective view of the directed jet mouthpiece 10 including a plurality of chevrons or relief holes 76 in the occlusal plane material 60. In one embodiment, the occlusal-side horizontal member 20 that extends between the buccal-side vertical member 16 and the lingual-side vertical member 18 comprises over mold material of elastomer. In addition, each of the plurality of chevrons of the occlusal-side horizontal member 20 extend between a top surface and a bottom surface thereof, i.e., between the upper and lower mouthpiece troughs, 12 and 14, respectively, as shown in FIG. 1. Furthermore, over mold material of elastomer is disposed on selective outside surfaces of the buccal-side and the lingual-side vertical members.

Both the buccal and lingual spines are over molded with soft 35A durometer cast urethane to form the outside surfaces of the mouthpiece. The horizontal section, disposed between the buccal and lingual spines and which lies in the occlusal plane, was designed without any rigid material in it. Advantageously, the use of only low durometer material in the area of the horizontal section promotes flexibility of the mouthpiece. To promote flexibility even further, the horizontal section has delta shaped chevrons or relief holes 76 in the occlusal plane material of the horizontal section of the occlusal-side horizontal member 20. These design features allow the mouthpiece to be compressed for easier installation into the user's mouth and creates a more comfortable fit.

Figure 12:
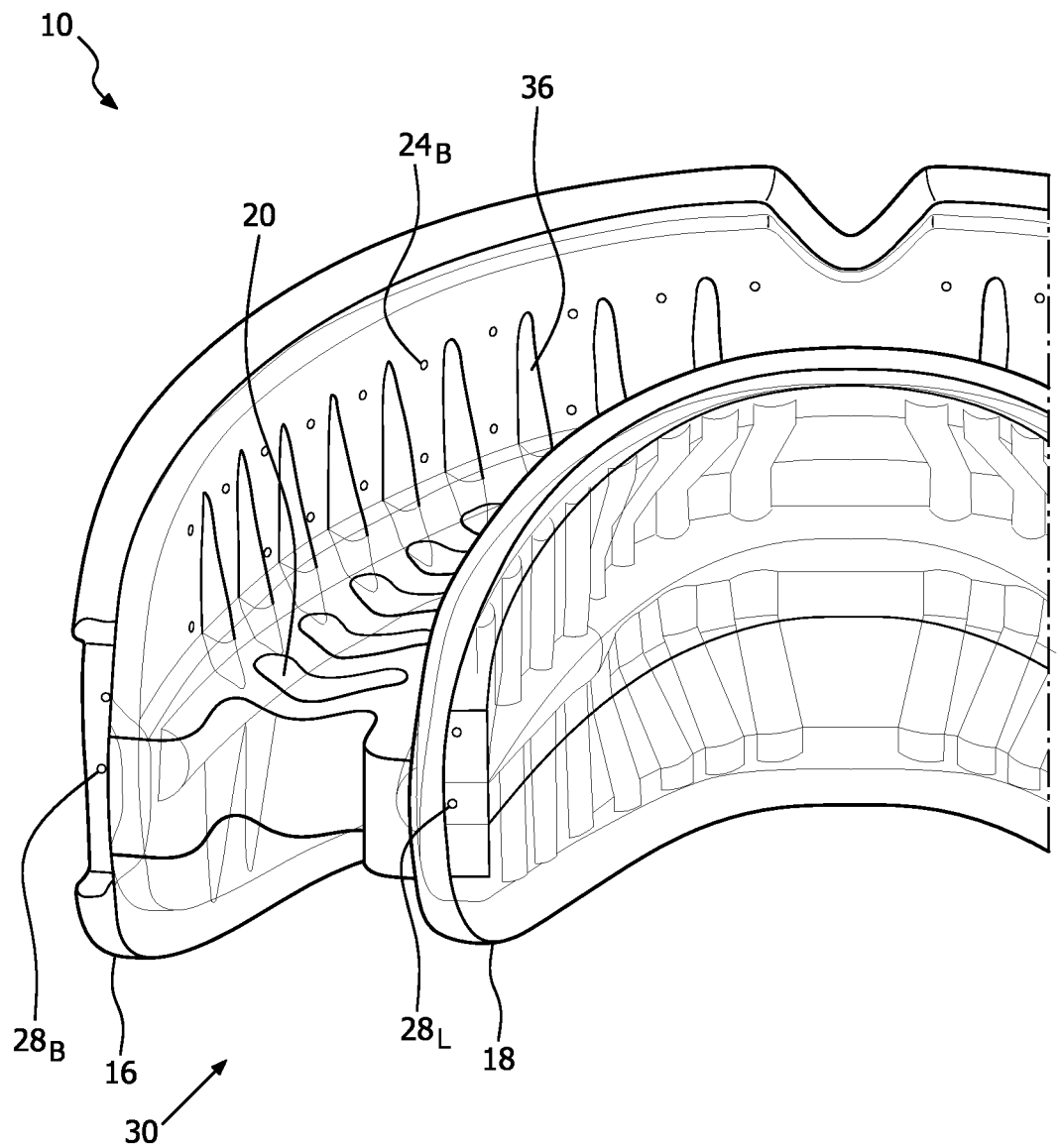
FIG. 12 is a partial see-through perspective view of the directed jet mouthpiece including exposed fluidics walls according to an embodiment of the present disclosure.

With reference now to FIG. 12, there is shown a partial see-through perspective view of the directed jet mouthpiece 10 including exposed fluidics walls according to an embodiment of the present disclosure. In particular, the buccal-side jet orifices $24_B$ face, i.e., are oriented to output or exhaust fluid jets, in a direction of the lingual-side vertical member 18. In addition, the lingual-side jet orifices $24_L$ (hidden from view in FIG. 12, but shown in FIG. 1) face, i.e., are oriented to output or exhaust fluid jets, in a direction of the buccal-side vertical member 16. In addition, the internal vertical walls of the "H" section are left as the exposed walls of the spines without overmold material. This allows for the plurality of jet orifices 24 on both the buccal-side and lingual-side vertical members, e.g., 0.25 mm diameter jet holes, to protrude out of the spines. This also allows the ribs 36 to be integrated into the spines. The ribs 36, aid in positioning the internal walls and jets of the mouthpiece at no less than a predetermined fixed distance, e.g., on the order of 2 mm, off the surface of the teeth when in use.

Figure 13:
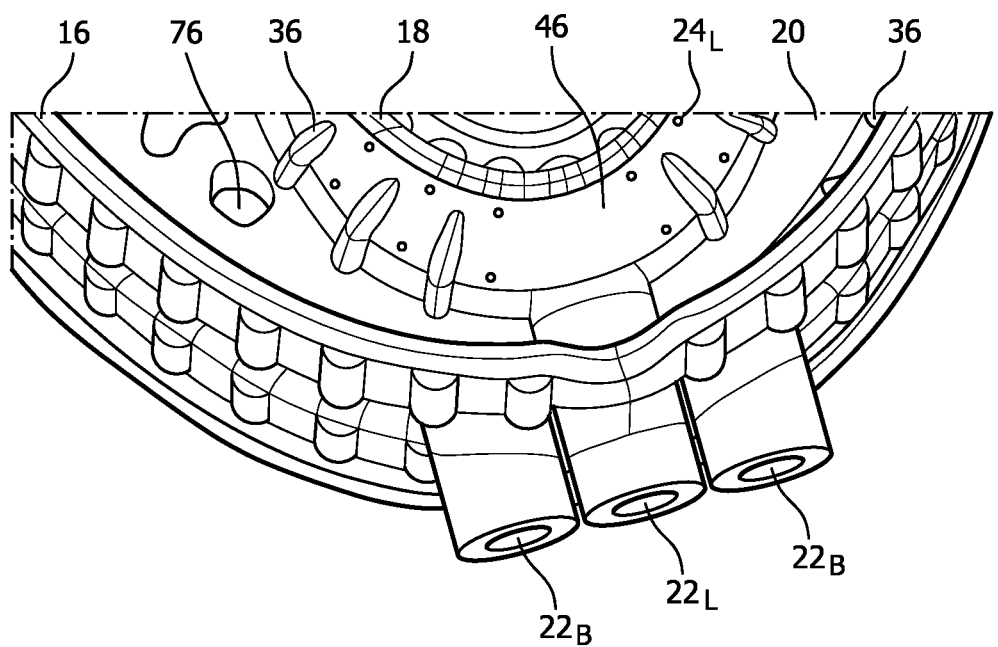
FIG. 13 is a partial perspective view of the directed jet mouthpiece including lingual and buccal inlets according to an embodiment of the present disclosure.

Turning now to FIG. 13, a partial perspective view of the directed jet mouthpiece 10 of FIG. 12 is shown. This illustration shows the lingual and buccal inlets 22 (22B, 22L, 22B), chevrons 76 in the occlusal plane material of the horizontal section of the occlusal-side horizontal member 20, and jet-to-teeth spacing ribs 36 vertically disposed and horizontally spaced apart from one another on adjacent sides of the buccal-side and lingual-side vertical members only, according to an embodiment of the present disclosure. In one embodiment, the lingual inlet 22L comprises a fluidics inlet coupled via at least one fluidics path between the fluidics inlet and the jet orifices 24L on the lingual side, whereas the buccal inlets 22B comprise a first and second fluidics inlet on the buccal side coupled via a first and second fluidics path between the respective fluidics inlet and corresponding first and second sets of jet orifices $24_B$ on the buccal side. Also shown is the angled trough surface 46 that includes a plurality of jet orifices $24_L$ on the lingual-side vertical member 18. Note that the plurality of jet orifices $24_B$ on the buccal-side vertical member 16 are hidden from view in FIG. 13.

Accordingly, the internal spines house the fluidics paths, the port holes and the fluid inlets. In one embodiment, the spines include a single rigid plastic component on the lingual side and one on the buccal side. Each part has its own inlet, configured for being coupled to a source of fluid, wherein the inlets protrude out the front of the mouthpiece, and thus out of the user's mouth during usage. The lingual side has an inlet in the center and the buccal side has two, one on either side of the lingual inlet.

Figure 14:
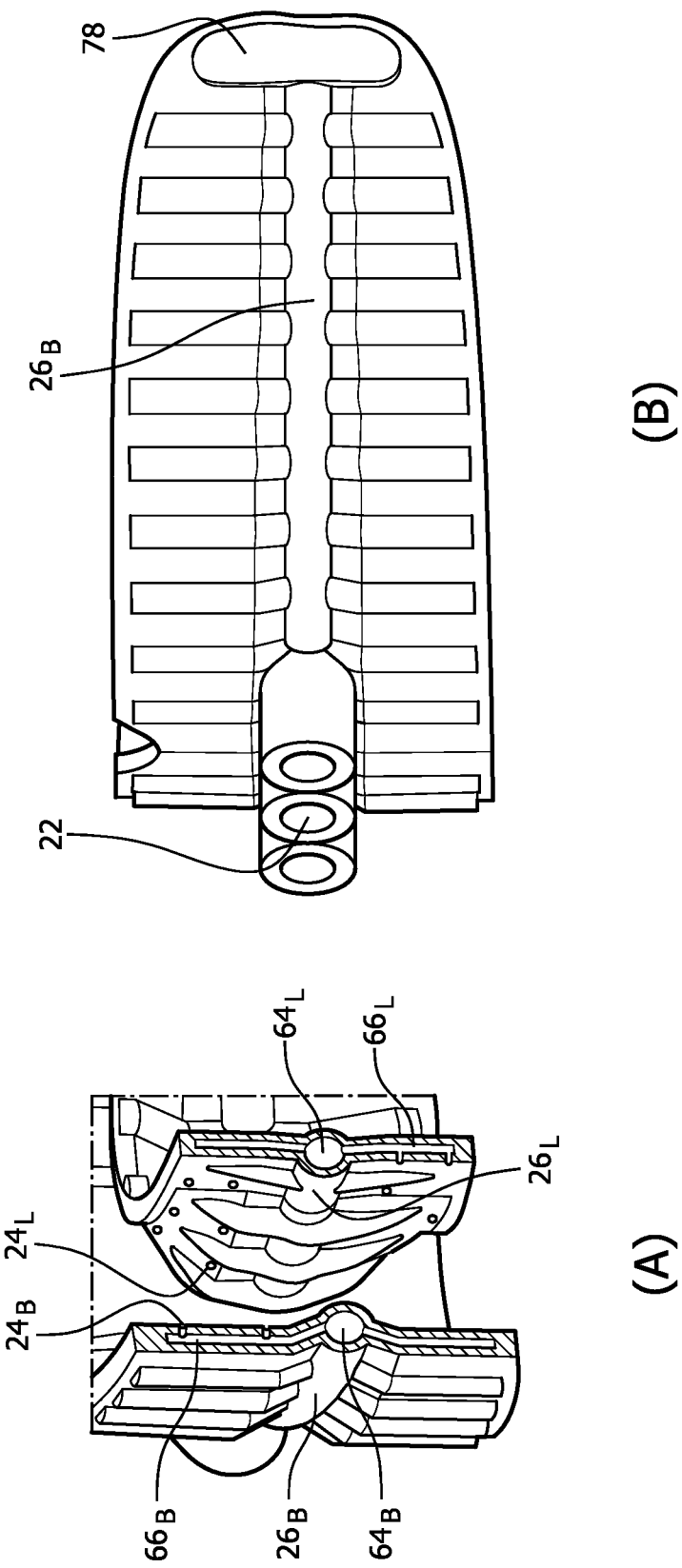
FIG. 14 is a cross-sectional view of the buccal and lingual spines of a portion of the directed jet mouthpiece without over molding (14A) and an external perspective view of fluidics channels of the directed jet mouthpiece without over molding (14B) according to an embodiment of the present disclosure.

With reference now to FIG. 14, there is shown a cross-sectional view of the buccal and lingual spines of a portion of the directed jet mouthpiece without over molding (14A) and an external perspective view of fluidics channels of the directed jet mouthpiece without over molding (14B) according to an embodiment of the present disclosure. The fluidics paths 26 ($26_B$, $26_L$) are composed of a single main channel 64 ($64_B$, $64_L$) that runs along the center line of each spine from the respective inlet 22 ($22_B$, $22_L$). In one embodiment, the main central channels 64 ($64_B$, $64_L$) have a cross-sectional area on the order of 5 mm². This center channel branches out into smaller channels 66 ($66_B$, $66_L$) that run vertically up and down along the respective spine. The smaller vertical channels 66 ($66_B$, $66_L$) are spaced at 5 mm apart with a cross-sectional "D" shaped area of 1.0 mm² and contain the 0.25 mm jet orifices or port holes 24 ($24_B$, $24_L$) on the inner surfaces. In other words, the secondary channels 66 are spaced apart from one another by a prescribed horizontal distance, and wherein each secondary channel 66 includes a "D" shaped cross-section having jet orifices 24 disposed within an inner flat surface thereof. In another embodiment, the jet orifices 24 disposed within the inner flat surface of a corresponding secondary channel 66 comprise at least two jet orifices.

Figure 15:
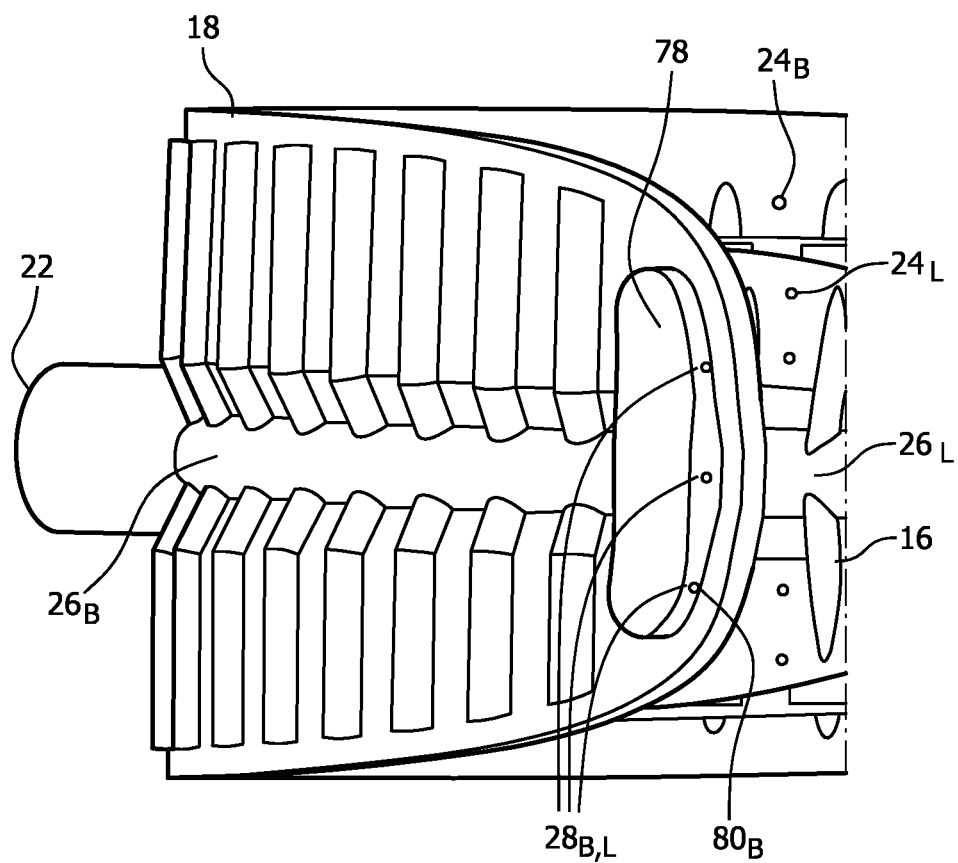
FIG. 15 is an external perspective view of a plenum with rear facing jets of the directed jet mouthpiece without over molding according to an embodiment of the present disclosure.

With reference now to FIG. 15, there is shown an external perspective view of a plenum 78 with rear facing jets 28 ($28_B$, $28_L$) of the directed jet mouthpiece 10 without over molding according to an embodiment of the present disclosure. In particular, each of the four ends of the horizontal fluid channels 64 ($64_B$, $64_L$) as seen in FIG. 14 open up into plenums 78 in the back of the mouthpiece, i.e., within the end regions 30 of the at least one mouthpiece trough (12, 14). In one embodiment, the plenums 78 each have three jet orifices or port holes 80 ($80_B$, $80_L$) that face the rear of the mouth to create the corresponding rear facing directed jets 28 ($28_B$, $28_L$).

Referring again to FIGS. 1, 2, 14 and 15, each of the end regions 30 of the at least one mouthpiece trough (12, 14) includes at least one vertically disposed plenum 78. In addition, at least one of the plurality of directed jet orifices 80 of directed jets 28 is disposed in the at least one vertically disposed plenum. In another embodiment, the at least one vertically disposed plenum 78 comprises one or more of (i) an inward vertically disposed plenum and (ii) an outward vertically disposed plenum on each end region 30 of the buccal-side and the lingual-side vertical members, 16 and 18, respectively, of the at least one mouthpiece trough (12, 14). In another embodiment, the plurality of directed jet orifices comprises three directed jet orifices disposed in each of (i) the inward vertically disposed plenum and (ii) the outward vertically disposed plenum.

Figure 16:
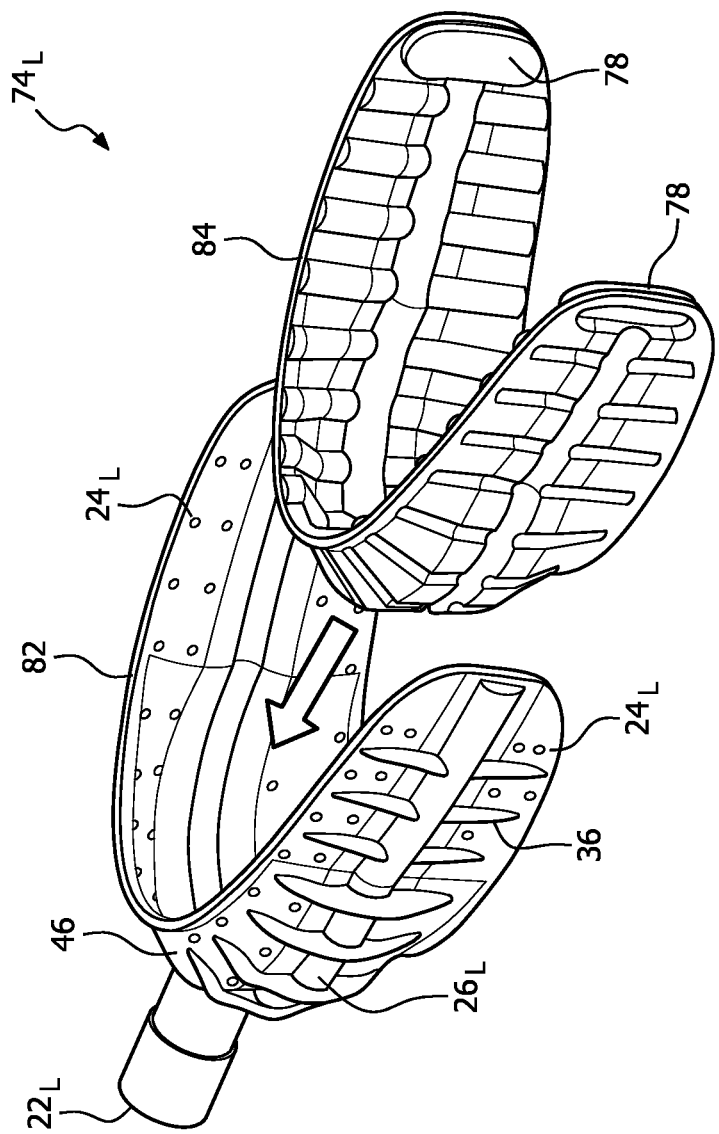
FIG. 16 is an exploded perspective view of a lingual spine assembly of the directed jet mouthpiece without over molding according to an embodiment of the present disclosure.

With reference now to FIG. 16, there is shown an exploded perspective view of a lingual spine assembly $74_L$ of the directed jet mouthpiece without over molding according to an embodiment of the present disclosure. While only the lingual spine is shown in FIG. 16, the same equally applies to the buccal spine, as appropriate. In other words, in one embodiment, each of the buccal spine $74_B$ and the lingual spine $74_L$ comprise two halves bonded together to form a respective spine with principal and secondary channels corresponding to the at least one fluidics path 26 ($26_B$, $26_L$). As shown, a first half 82 is fitted and rigidly secured, via an appropriate bonding and/or sealant material, with a second half 84 which together comprise the lingual spine $74_L$.

The mouthpieces have been constructed using MED610 Polyjet material for the rigid fluidics parts. These rigid fluidics parts were over molded with Steralloy 2036-5, an elastomeric material that is gravity fed into a mold made from food safe silicone.

As discussed herein, the lingual and buccal spines house the internal fluidics channels. In one embodiment, the lingual and buccal spine parts can be built as enclosed volumes in which a support material used during their construction would be rinsed and/or etched, via a suitable rinse or etch bath, from the fluidic channels. In another embodiment, each of the lingual and buccal spines are constructed in at least two pieces, i.e., by splitting each part down the center to expose all the channels. In this later embodiment, this allows the parts to be printed, or alternatively, injection molded, in two halves creating exposed C sections that can easily be cleaned. The two halves were then bonded together, for example, using Loctite 3311 UV cured glue, to create the respective final spine with fluid channels. Mouthpieces can be created using 3D printer; other suitable methods known in the art could also be employed for producing the parts. In addition to producing the spine parts, a suitable over mold process is used for casting over the spine parts. In conjunction with the over mold process, the fluidics channels are blocked, as appropriate, for preventing resin used for the over mold from flowing into the fluidics channels.

Figure 17:
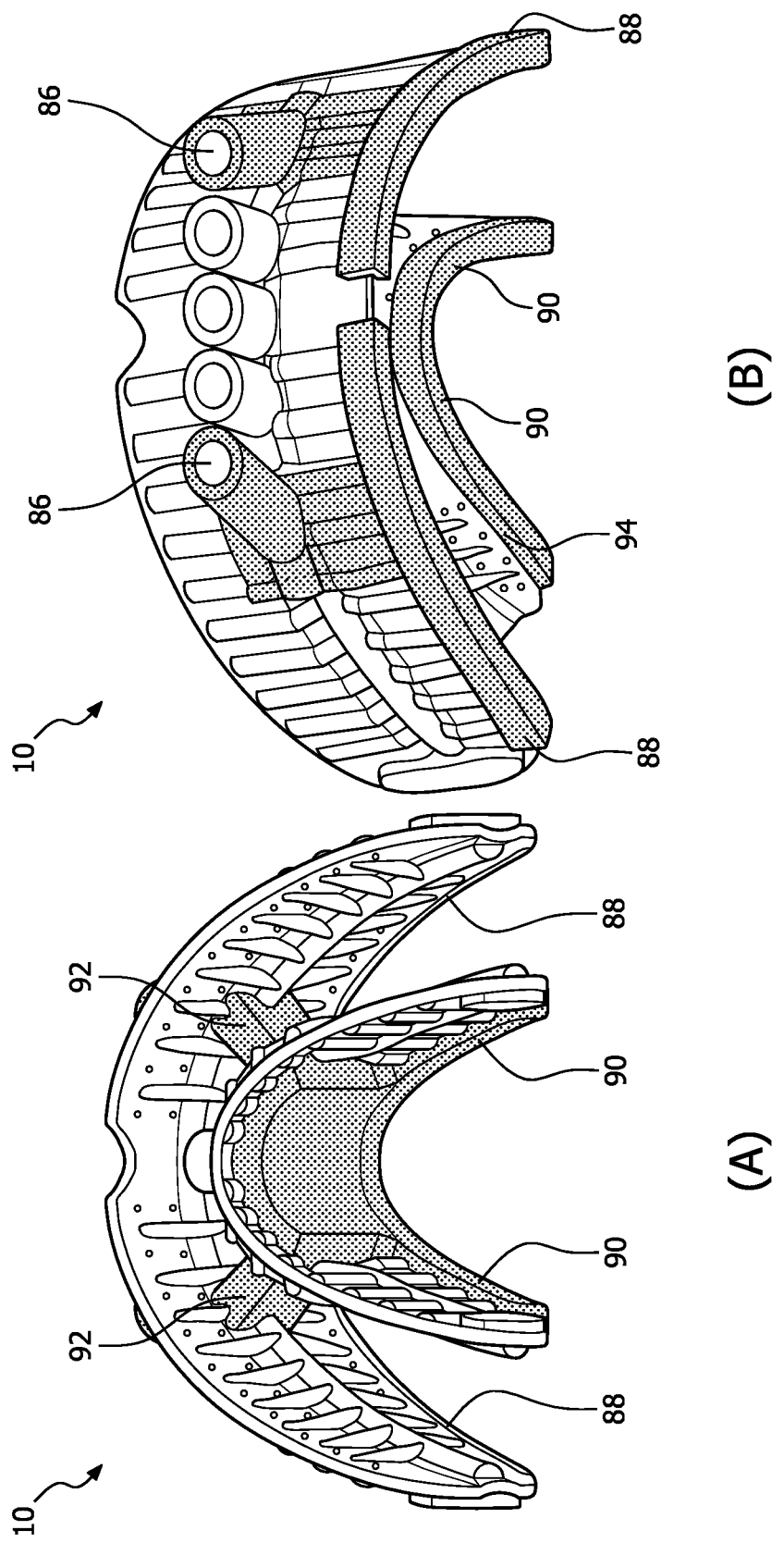
FIG. 17 is a rear perspective view of the buccal and lingual spines of the directed jet mouthpiece including dedicated vacuum lines without over molding (17A) and a front perspective view of the buccal and lingual spines of the directed jet mouthpiece including at least one vacuum port and dedicated vacuum lines without over molding (17B) according to an embodiment of the present disclosure.

With reference now to FIG. 17, there is shown a rear perspective view of the buccal and lingual spines of the directed jet mouthpiece including dedicated vacuum lines without over molding (FIG. 17A) and a front perspective view of the buccal and lingual spines of the directed jet mouthpiece including at least one vacuum port and dedicated vacuum lines without over molding (FIG. 17B) according to another embodiment of the present disclosure. In this embodiment, a vacuum port 86 couples to a dedicated vacuum line disposed in one or more of a buccal-side vacuum support member 88, a lingual-side vacuum support member 90, and a pass-through member 92 disposed between the buccal-side vacuum support member 88 and the lingual-side vacuum support member 90. The pass-through member 92 comprises one or more of a single pass-through member and a multiple pass-through member. Each of the buccal-side vacuum support members 88 and lingual-side vacuum support members 90 include a plurality of vacuum extraction port apertures 94. The directed jet mouthpiece with fluidics can further include use of a strong vacuum configured for achieving higher flow rates, the latter of which have been estimated for good teeth cleaning performance. As a result, the embodiment includes a dedicated vacuum line integrated into the design. The illustration of FIG. 17 shows the modified fluidics without the over mold. The vacuum support members that support the vacuum have been identified, as discussed herein above.

With reference now to FIG. 18, there is shown a rear perspective view of the buccal and lingual spines of the directed jet mouthpiece including dedicated vacuum lines with over molding (FIG. 18A) and a front perspective view of the buccal and lingual spines of the directed jet mouthpiece including at least one vacuum port and dedicated vacuum lines with over molding (FIG. 18B) according to an embodiment of the present disclosure. FIG. 18 represents the embodiment of FIG. 17, only now including the over molding. As can be seen in FIG. 18A, chevrons 76 are included in the occlusal section 20. The chevrons in the occlusal section advantageously allow fluid in the upper trough 12 to flow down to lower trough 14 and be picked up by the vacuum.

With reference now to FIG. 19, there is shown a rear perspective view of the buccal and lingual spines, $74_B$ and $74_L$, respectively, of the directed jet mouthpiece 10 including at least one vacuum pass-through 92 and dedicated vacuum lines without over molding according to an embodiment of the present disclosure. The addition of the dedicated vacuum lines allows the original fluid channels to be dedicated to only supply pressure (i.e., positive fluid flow). The current five inlets (FIGS. 17 and 18) could be reduced to three. There could be one pressure inlet for the buccal side, one for the lingual side and one vacuum inlet. Placing the vacuum inlet in the center would have the added advantage of allowing a, now single, pass-through part to also be placed in the center. This placement of the single pass-through would promote flexibility of the overall mouthpiece.

In addition, the dedicated vacuum line has the ability to use large vacuum port holes. Experience with prototypes suggests that when using the jet orifices as a vacuum, the jet orifices are prone to blockage. The jet orifices are restricted in size to promote the jetting action and therefore may not be ideal for vacuum due to the blockage issue and added restriction.

The form factor on the embodiments of the mouthpiece can also be modified according to the requirements of a given implementation or fit check. Both the fit and overall size could be optimized according to particular needs. Trough size can be tailored to be suitable for most people's teeth. The trough size may be adjusted as needed. For example, the trough size could potentially be decreased in width or the ribs could be increased in height. In addition, the thickness of the occlusal plane elastomer could be reduced based on comments from the fit check. Reducing the pass-through to a single part and placing it in the center might also make it possible to reduce the mouthpiece thickness. Still further, modifications can be made to the dedicated vacuum support members, as appropriate, for a given implementation. The balancing of the vacuum to flow is important. Vacuum can be enhanced by a user sealing with lips and tongue, similar to that of a dental vacuum, whereby the vacuum becomes more effective for pulling excess fluid out of the user's mouth.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. An oral hygiene mouthpiece comprising:
   a mouthpiece trough configured to fit over at least a front portion of a dental arch of teeth in a user's mouth, the mouthpiece trough having a buccal-side vertical member, a lingual-side vertical member and an occlusal-side horizontal member that extends between the buccal-side and the lingual-side vertical members, wherein the mouthpiece trough includes a fluidics inlet, a plurality of jet orifices on both the buccal-side and lingual-side vertical members, and a fluidics path disposed between the fluidics inlet and the jet orifices, and wherein an end region of the mouthpiece trough includes a vertically disposed plenum disposed on a rear surface of the end region; and
   a directed jet orifice facing a rearward direction towards a back of the user's mouth and disposed on a rear surface of the vertically disposed plenum facing the back of the user's mouth, wherein the fluidics path is further disposed between the fluidics inlet and the directed jet orifice, wherein the directed jet orifice is configured for directing a fluid jet rearward towards a tooth beyond the end region of the mouthpiece trough.

2. The mouthpiece of claim 1, wherein the vertically disposed plenum comprises one or more of (i) an inward vertically disposed plenum on an end region of the lingual-side vertical member and (ii) an outward vertically disposed plenum on an end region of the buccal-side vertical member of the mouthpiece trough.

3. The mouthpiece of claim 1, wherein the occlusal-side horizontal member includes chevrons extending between a top surface and a bottom surface thereof.

4. The mouthpiece of claim 1, wherein the fluidics path comprises a buccal spine and a lingual spine, each including a principal channel that traverses horizontally along each of the buccal spine and lingual spine, and further including secondary channels, smaller in cross-section than the principal channel, extending vertically from the horizontally disposed principal channel.

5. The mouthpiece of claim 4, wherein the secondary channels are spaced apart from one another horizontally, and wherein each secondary channel includes a "D" shaped cross-section having jet orifices disposed within an inner flat surface thereof.

6. The mouthpiece of claim 4, wherein the lingual spine is configured with a compensating geometry that transitions from a vertical surface to an angled surface between positions that correspond to positions of canine teeth in the user's mouth, and closely matching lingual sides of incisors angled with respect to lingual sides of molars in the user's mouth.

7. The mouthpiece of claim 4, wherein each of the buccal spine and the lingual spine comprise two halves bonded together to form a respective spine with principal and secondary channels corresponding to the fluidics path.

8. The mouthpiece of claim 1, wherein the fluidics inlet comprises a buccal-side fluidics inlet coupled to the fluidics path within the buccal-side vertical member, and further comprising a lingual-side fluidics inlet coupled to the fluidics path within the lingual-side vertical member.

9. The mouthpiece of claim 1, wherein the mouthpiece trough further includes a plurality of jet-to-teeth spacing ribs vertically disposed and horizontally spaced apart from one another on adjacent sides of the buccal-side and lingual-side vertical members.

10. The mouthpiece of claim 1, wherein the occlusal-side horizontal member that extends between the buccal-side and the lingual-side vertical members comprises an elastomer over-mold material disposed on selective outside surfaces of the buccal-side and the lingual-side vertical members.

11. The mouthpiece of claim 1, further comprising:
   a vacuum port coupled to a dedicated vacuum line disposed in one or more of a buccal-side vacuum support member, a lingual-side vacuum support member, and a pass-through member disposed between the buccal-side vacuum support member and the lingual-side vacuum support member,
   wherein the pass-through member comprises one or more of a single pass-through member and a multiple pass-through member.

12. The mouthpiece of claim 1, wherein the vertically disposed plenum comprises:
   (i) an inward vertically disposed plenum on an each end region of the lingual-side vertical member and (ii) an outward vertically disposed plenum on each end region of the buccal-side vertical member of the mouthpiece trough.

* * * * *